United States Patent [19]

Mayer

[11] 4,033,016

[45] July 5, 1977

[54] CRANKSHAFT WELDED TOGETHER FROM INDIVIDUAL ELEMENTS, AND METHOD OF MAKING SAME

[75] Inventor: Karl Mayer, Nuremberg, Germany

[73] Assignee: Maschinenfabrik Augsburg-Nurnberg AG, Nuremberg, Germany

[22] Filed: May 5, 1976

[21] Appl. No.: 683,333

Related U.S. Application Data

[62] Division of Ser. No. 585,301, June 9, 1975.

[30] Foreign Application Priority Data

June 8, 1974 Germany ............................ 2427801

[52] U.S. Cl. ....................................................... 29/6
[51] Int. Cl.² ........................................... B21K 1/08
[58] Field of Search ............................................ 29/6

[56] References Cited

UNITED STATES PATENTS

| 2,256,726 | 9/1941 | Rippingille | 29/6 X |
| 2,403,049 | 7/1946 | Carstens | 29/6 |
| 3,144,702 | 8/1964 | Wuppermann | 29/6 |
| 3,768,335 | 10/1973 | Mayer | 29/6 |
| 3,772,763 | 11/1973 | Henson | 29/6 |

*Primary Examiner*—Harrison L. Hinson
*Attorney, Agent, or Firm*—Walter Becker

[57] ABSTRACT

A crankshaft which is composed of a plurality of individual elements. Each of said elements comprises a crankshaft section with an end face and bearing surface means and also comprises a main shaft journal section with an end face and with bearing surface means. The end faces of pin sections to be connected to each other are electron beam welded together after centering pins have been inserted in bores arranged in, and perpendicular to the end faces to be welded together.

1 Claim, 2 Drawing Figures

CRANKSHAFT WELDED TOGETHER FROM INDIVIDUAL ELEMENTS, AND METHOD OF MAKING SAME

This is a division of co-pending application Ser. No. 585,301, Mayer, filed June 9, 1975 (Monday).

The present invention relates to a crankshaft which is welded together from individual sections and in which the individual sections comprise a crank web and two half crank pins or one half crank pin and one half main shaft journal, while at the end faces of the half pins or journals there are respectively provided a centering means and a slag ring groove, and in which the said individual sections are prior to being welded together provided with all necessary lubricating passages.

A crankshaft of the above mentioned type has become known in which one of the two end faces of the half ring pins and of the main shaft journals, which end faces have to be welded together, having a centering protrusion entering a bore of the respective other end face. However, it has been found that the different design of the end faces has an unfavorable effect during the finishing operation as well as during the drop-forging. Directly around the centering means there is provided a slag ring groove. The lubricating oil passage extending from one bearing area to the other through the crankshaft is in each crankshaft section composed of two sections. On one hand, each section is from the end face provided with the centering protrusion equipped with a bore which is arranged centrally in the centering protrusion and extends parallel to the axis of the crankshaft. On the other hand, a passage extends from the bore for the centering protrusion of the adjacent welding connection at an incline through the crank web. Both passages meet each other in the interior of each crankshaft section and define the lubricating oil passage. A production of this type is rather expensive inasmuch as it requires a precise boring. Furthermore, the individual bores frequently have to be relatively long as a result of which a slight lack in precision can have harmful effects. On the other hand, frequently there exists the necessity to make the lubricating passages so complicate because a single inclined bore through the crank of the crankshaft is not possible. Even if this were possible, the bores would be relatively long. Finally, with the above mentioned design the lubricating passages leading to the bearing surfaces are designed as bores arranged adjacent the welding surface in only one of the journal halves or sections, which bores have to intersect with the axle bores.

It is, therefore, an object of the present invention so to improve a crankshaft of the above mentioned type that the manufacture of the individual sections as well as their assembly will be materially simplified and thereby reduced in price while in particular the lubricating oil passages can be more easily manufactured and a productive mass fabrication will be made possible.

These and other objects and advantages of the invention will appear more clearly from the following specification in connection with the accompanying drawing in which.

Figure 1:
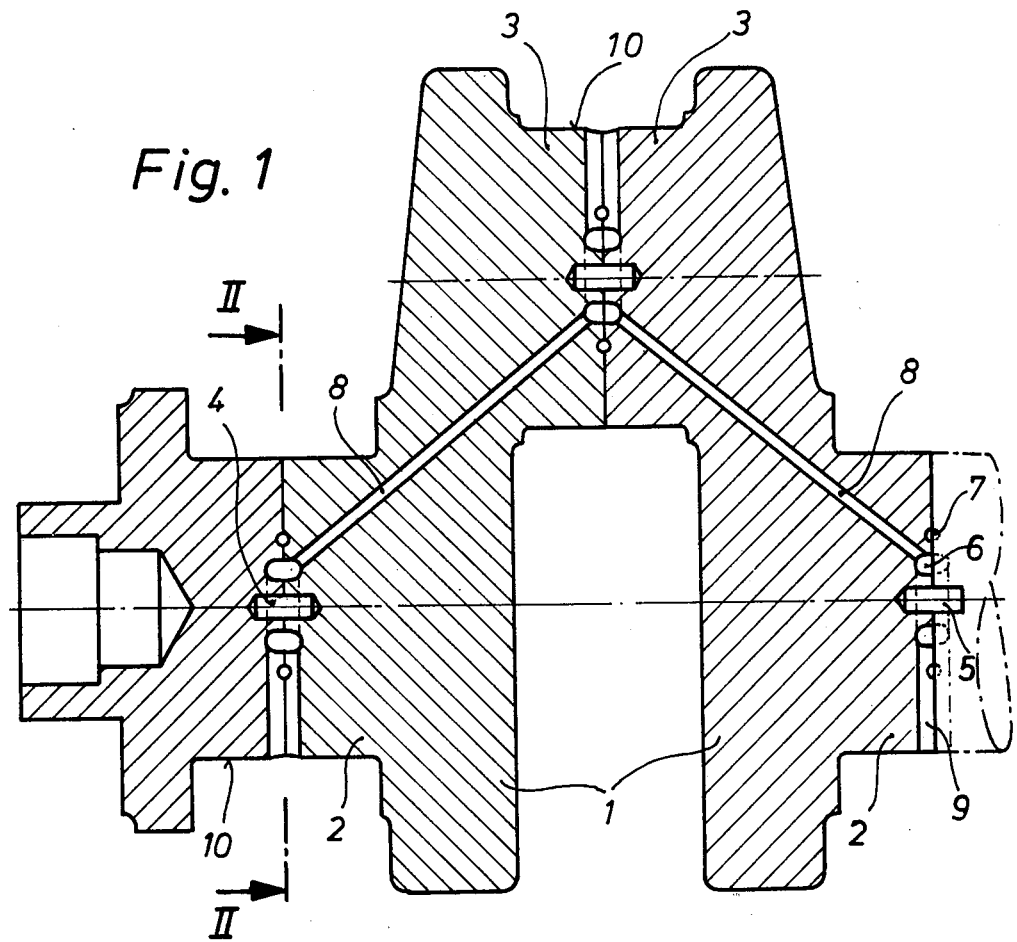
FIG. 1 represents a longitudinal section through a portion of a crankshaft according to the invention.

The crankshaft according to the present invention is welded together from individual sections; the individual sections each comprise a crank web and two half crank pins or one half crank pin and one half main shaft journal; the end faces of the half pins are respectively provided with centering means and a slag ring groove; the sections prior to being welded together are provided with all necessary lubricating passages. The foregoing is characterized primarily in that the centering means comprise at least one bore centrally arranged in each end face of a half crank pin or the main shaft journal and furthermore comprise a centering pin adapted to be inserted into two adjacent bores; furthermore between the centering means and the slag ring groove there is provided an annular lubricating oil groove one section of which is provided in one end face while the other section is provided in the adjacent end face. The crankshaft according to the present invention is furthermore characterized in that all lubricating channels provided in the crank webs as well as the lubricating passages extending in the radial direction with regard to the respective bearing surfaces led into the annular lubricating oil grooves or start therefrom.

Due to the design of the centering means by means of centering pins, all individual sections of the crankshaft may be the same shape and can therefore be produced in a forging die which additionally when a separation is effected in the plane of the crank web can be very small. Due to this forging die, also a proper texture can be secured. This applies to all parts of crankshafts which are produced together with the counterweight while, if desired, changes in weight which might become necessary can be realized by the provision of bores. Also the finishing of all end faces is, of course, always the same, and continuous readjustments of the machines will not be necessary. The provision of the annular lubricating groove, in addition to permitting an easy manufacture has the important advantage that the lubricating oil passage leading from one separating area to the other through the crank web can be placed in the respective most favorable area whereby a minimum length will be realized and an otherwise necessary angling-off can be avoided. Also the placement of the radial lubricating passage in the welding plane results in a simplification of the manufacturing process and furthermore, as will be explained further below, when employing electron beam welding brings about the advantage that the beam can be started at the passage and a previous boring to the prescribed depth is not necessary. Inasmuch as this lubricating passage briefly crosses the slag ring grooves, a proper venting thereof is effected.

According to a further development of the invention, it is suggested in the end faces of the respective crank pins engaging each other and/or the main shaft journal outside the annular lubricating groove and the slag ring groove to provide and additional fixing bolt positioning the crank webs relative to each other whereby the precise angular position of the crank webs will be made possible and a later time-consuming alignment of the crankshaft will not be necessary. According to a particularly advantageous method of making a crankshaft according to the invention, the individual sections are designed symmetrically and are preferably drop-forged, all crank pin sections are finished including their end faces, all half main shaft journals are pre-machined, all lubricating oil passages are bored, each two half crank pins or sections are placed adjacent to each other and are set in conformity with their crank. Each two half crank pins are welded to each other by electron beam welding while, however, the electron beam starts at the radially extending lubricating passage and after one circulation ends at the same place and simultaneously is set for a depth which extends up to the slag ring groove or slightly beyond the same, each two half main shaft journals are arranged adjacent to each other and set as to their crank, the main shaft journals are electron beam welded, and finally the crank pins and main shaft journals are honed and the ends of the radial lubricating passages are mechanically rounded in one working operation. In connection with this method it is to be emphasized that the crank pins can immediately be finished, that the welding operation can be carried out in a minimum of time, and that due to the arrangement of only radial lubricating oil passages on the outer surface of the crankshaft, the ends thereof can be machine-rounded in one working operation. The finishing of the main shaft journals is therefore effected only after the crank pins have been welded together so that also even slight deviations in the length which could add to each other and lead to undue dimensions will be avoided.

Referring now to the drawing in detail, FIG. 1 shows a portion of a crankshaft according to the invention with crank webs 1, the half or main shaft journals 2 and the crank pin halves or sections 3. Each crank web 1 and two crank pins 3, or one crank pin section 3 and one main shaft journal 2 together form one part, preferably drop-forced. In the end faces of the main shaft journal sections 2 and the crank pin sections 3 there are provided central bores 4 into which is placed at each dividing area a centering pin 5. Around the centering pin 5 there is provided an annular lubricating oil groove 6, one half or section of which is provided in the crank pin journal 2 while the other half or section is provided in the respective adjacent crankpin section 3.

The annular lubricating oil groove 6 is surrounded by an annular slag ring 7 of a considerably smaller cross section.

Figure 2:
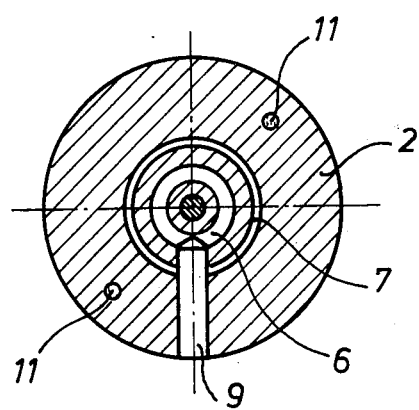
FIG. 2 represents a section through the crankshaft of FIG. 1, said section being taken along the line II-II of FIG. 1.

A lubricating oil passage 8 leads from the annular lubricating oil groove 6 of one section 2 or 3 to the annular lubricating oil groove 6 of the other respective pin section pertaining to the same section so that the oil passage 8 forms the shortest connection between the two annular grooves. Finally, lubricating passages 9 lead from the annular oil groove 6 in radial direction to the respective bearing surfaces 10. These lubricating passages 9 have one half or section milled into a pin section and cross the slag groove 7 whereby a venting thereof is possible. FIG. 2 shows that outside the annular slag groove 7, a fixing bolt 11 may be provided between each two crank webs for precisely setting the angular position.

It is, of course, to be understood that the present invention is, by no means, limited to the specific showing in the drawing but also comprises any modifications in the appended claims.

Thus, also the eccentric arrangement of one of more centering bolts is possible in connection with the present invention although such an arrangement is more complicated and expensive than the arrangement described above in detail.

I claim:

1. A method of making a crankshaft from a plurality of individual elements each comprising a crank pin section with an end face and bearing surface means, and also comprising a main shaft journal section with an end face and with bearing surface means, which includes in combination the sequential steps of: first forging the individual elements in a die as symmetrically embodied elements, then finish machining all crank pin half sections including their end faces, thereafter pre-machining all main shaft journal sections, subsequently drilling all lubricating oil grooves and conduit means communicating therewith, engaging with each other the crank pin end faced to be welded together and offsetting the same in the desired manner, specifically electron beam welding together the crank pin sections to be connected to each other while starting the electron beam on radially extending lubricating conduits and ending the same after only one revolution while setting the electron beam to a desired depth, finish machining the main shaft journal sections, placing together each two main shaft sections to be welded together and offsetting the same to the desired extent, thereafter specifically electron beam welding the main shaft journal sections together and honing the crank pin sections and main shaft journal sections, and finally machine-rounding the ends of the radial lubricating conduits in one working step.

* * * * *